Figure 1:
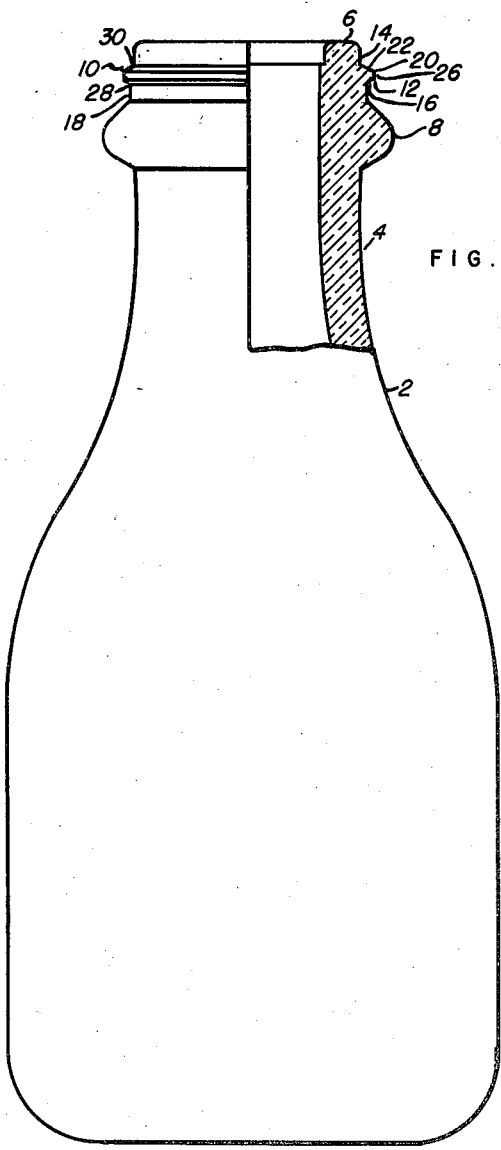

May 11, 1943.   B. A. JACKSON   2,318,611
CONTROLLED DRIP MILK BOTTLE
Filed March 10, 1941

BRUCE A. JACKSON
INVENTOR.
BY
ATTORNEY

Patented May 11, 1943

2,318,611

UNITED STATES PATENT OFFICE 2,318,611

CONTROLLED DRIP MILK BOTTLE

Bruce A. Jackson, Oakland, Calif.

Application March 10, 1941, Serial No. 382,528

6 Claims. (Cl. 215—31)

This invention provides for the control of otherwise spillable milk lost incident to pouring the contents of a glass milk bottle from the bottle, in such a way that any milk residue left on the bottle after cessation of pouring will not run down the sides of the bottle, but will in preference seek a site near the bottle rim from which it will not ordinarily depart. The invention further provides this advantage in a milk bottle conforming to other desirable criteria of present day bottles, retaining substantially all their advantages.

In addition, this invention provides a milk bottle from which milk may be poured at a slow rate while the bottle is very nearly full, the pouring being at a definite point of departure, which point is near the bottle rim and always at the lowest gravital point adjacent the bottle rim, it being a matter of indifference what peripheral point of the bottle rim is lowermost. By this provision a small stream of milk be poured from the bottle while it is still nearly full and the provisions of this invention prevent the milk from adhering to the very nearly vertical outside wall of the bottle and running off at some unpredictable point. Accordingly, my invention provides a definite lowermost point downward of the bottle rim below which the milk will not adhere to the bottle irrespective of the angle at which the bottle axis is disposed during pouring, and pouring of small quantities of milk from a bottle which is full is practical without spilling.

Further, it is a distinct advantage of the milk bottle of this invention that milk may be poured from it repeatedly and yet avoid, without special effort, the usual accumulation of drippings spreading downward on the outside of the bottle. The invention provides for the prevention of any initial wetting of the outside of the bottle wall below the point of departure of the poured stream, so that; no matter how often pouring is effected, there is no more reason for milk to run down in a second pouring than there is in a first pouring.

At the instant of cessation of pouring from any milk bottle, the previously continuous stream of liquid commences to divide into three discrete portions which become; one portion inside the bottle, another portion entirely detached from the bottle, and the portion which adheres to the exterior of the bottle at least temporarily and which portion may be termed "drip." This varies in amount, depending upon the rate of flow at the instant of cessation, the bottle size, the rapidity of erecting the bottle, and possibly others. My invention so provides that its effectiveness includes all quantities of drip under ordinary conditions of use, being fully effective to prevent spreading of drip down the bottle wall whether the poured stream be small or large, often repeated or infrequent, whether the bottle be near full or empty at cessation of pour, and whether the bottle be righted hastily or deliberately.

The bottle of my invention, while providing the advantages pointed out in the foregoing, is nevertheless remarkably simple as respects not only appearance, but its fitness to conventional methods and molds for milk bottle manufacturing, its amenability to present methods of bottle washing and sterilization, and conformity to requirements of former bottles in all other respects.

Figure 2:
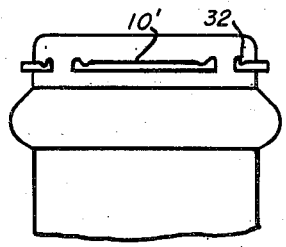
Figure 3:
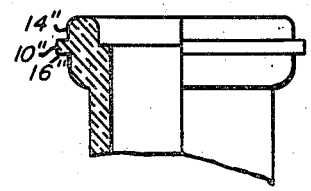
Figure 4:
Figure 5:
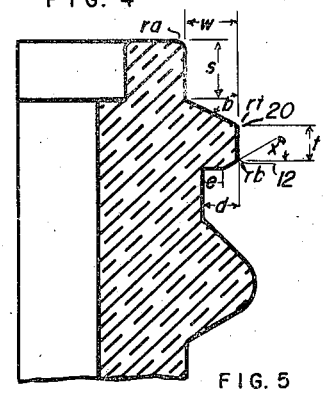

The foregoing, and additional objects of my invention will become apparent in the following specification wherein reference is had to the accompanying drawing, in which:

Figure 1 is an elevational view of a milk bottle with a fragmentary quarter section cut away along diametral planes;

Figures 2, 3, and 4 are fragmentary illustrations of variant forms of the invention; and Figure 5 is an enlarged, somewhat distorted, section of details of the invention.

The preferred embodiment provides a milk bottle 2 having a neck 4 with a top rim 6 and the usual rim protecting bumper roll 8 disposed some distance below the rim edge. Between the rim and the bumper roll I provide a continuous peripheral shelf 10 proportioned in accordance with the following specification to effect a milk bottle having the advantages above pointed out. The bumper roll 8 is displaced downwardly from the rim 6 to provide the necessary clearances for the shelf and adjacent surfaces, but retains its rim protective function and also protects the shelf 10 from injury.

The shelf 10 functions to provide at its lower periphery 12 a definite lowermost boundary of departure from the bottle irrespective of the degree of tilt for pouring, and also provides in conjunction with the adjoining upper surface 14 of the bottle neck a retreat region for the "drip" as above defined, in which all of the drip comes to rest upon cessation of pouring irrespective of the angularity of the bottle axis at the time of cessation of pour. The undersurface 16 of the shelf, being almost if not fully normal to the bottle axis, is, when the bottle is tilted slightly, inclined upwardly with respect to the direction of gravital attraction, so that in pouring, the liquid does not tend to creep thereunder even at low angles of tilt, the preponderance of force acting upon the liquid particles being gravital, which, through the mutual attraction therebetween, causes the outermost particles to draw the inner ones away from the edge 12 and outwardly. This lower reentrant surface 16 of the shelf, therefore, prevents wetting of the neck by creepage of the liquid during pouring so that the pouring may be repeated as often as desired without accumulating enough moisture to cause the stream to bridge the lower reentrant surface to the subjoining lower surface 18 of the bottle neck or to the bumper roll.

When the stream breaks at cessation, any part of the drip which is at that instant gravitally below or outside of the upper edge 20, is drawn back up onto the shelf through coherence of the particles to those closer to the shelf and upper neck portion 14, and by capillary action of the film which is in contact with portion 14 and which is drawn upward thereover by capillary attraction while the mass of drip is supported by and adheres to the top surface 22 of the shelf.

From the point of view of operation as above described, the upper, 22, and the lower, 16, surfaces of the shelf 10 would in the ideal situation, be in an abrupt right angle to the neck and the lateral surface 26 thereof. Also, the boundary corners at 12, 20, 28, and 30 would be as abrupt as it is theoretically possible to make them. The upper and lower surfaces 16 and 22 are allowably conoidal to a slight degree. By making the corner 30 sharp, a maximum area of glass surface is presented for adherence and capillary action with the liquid. The various corners are, however, rounded with a very small radius of curvature consistent with the making of glass molds to provide these glass corners with resistance to chipping.

In addition to its protection of the bottle rim and pouring lip shelf, the bumper roll 8 operates as a stop for the hand grasping the bottle neck 4 so as to prevent the hand from engaging the under surface of the shelf. If the hand is permitted to engage this under surface the under surface is moistened by the hand so that pouring may extend across the under surface and thus onto the subjacent neck portion 18. Since milk bottles very frequently collect vapor condensate on the neck, as after removal from a refrigerator, a grasping of the neck by the hand transfers a portion of the moisture from the neck to the thumb and forefinger of the hand and, if the so moistened portion of the hand touches the under surface of the shelf, it is wetted sufficiently to prevent the anti-drip function. Accordingly, the bumper roll 8 serves to prevent contact wetting of the shelf. It is observed that the under surfaces of the shelf do not collect condensate sufficiently to constitute wetting.

While the foregoing serves to not only explain the invention but also to described a construction which will work satisfactorily, experience shows that certain dimensions and limits are preferable and some are necessary in order to achieve all of the advantages recited above. The diagram of Figure 5 provides characters to indicate dimensions and reference is made thereto in the following specification.

The radius of curvature $ra$ of the rim is not critical and may be in the vicinity of .05 inch.

The vertical extent $s$ of the surface 14, inclusive of curvature $ra$ should be more than .06 inch but not more than .25 inch, a value of .15 inch being preferred. If $s$ be less than the minimum there is insufficient adherence between the drip and the wall to retain the drip on the shelf; or if more that the greater value, too much liquid is caught on the shelf for its entire retention by the shelf.

The protrusion $w$ of the upper surface of the shelf 10 should be equal to or greater than .05 inch and not more than .13 inch, with a preference for .08 inch.

The thickness $t$ of the shelf at a point .02 inch inward of the upper edge is of the order of .10 inch and should not exceed .12 inch.

Portion 14 is preferably exteriorly cylindrical, and of about .18 inch or upward in thickness, interiorly providing a usual cap shoulder if desired.

The radius $rb$ is of the order of .02 inch for maximum sharpness together with a maximum degree of resistance to chipping.

The bottom surface 16 of the shelf is preferably entirely flat, and normal to the bottle axis, but may include the external conoidal portion making an angle $x$ not greater than 20 degrees with the horizonal for cream bottles and 30 degrees for milk bottles. It is especially desirable to provide a uniform annular section entirely around the bottle at this region so that there is no point lower than any other toward which creepage will tend.

The indentation $d$ is of the order of .03 or .04 inch.

The radius $rt$ is of the order of .02–.03 inch for protection of the shelf from chipping.

The top surface 22 of the shelf 10 is preferably flat and normal to the bottle axis, but may be partially or wholly inclined to a slight angle $b$ for mold clearance, the inclination $b$ of the drawings being considerably exaggerated.

The bumper roll 8 is spaced downwardly only far enough to provide sufficient clearance to prevent the liquid from bridging thereto from $rb$ at minimum angles of pour.

In Figure 2, the construction is shown modified to provide a series of shelves 10' which may also be used for securement of a hood type closure, or a closure provided with lugs to engage beneath the shelves, scallops 32 being provided to prevent endwise spilling off the shelves.

In the modification of Figure 3, the shelf 10" is extended from the bumper roll directly adjoining the rim, this construction being, however, easily damaged.

In Figure 4 the steps 32' forming the upper surface of the shelf increase the area of capillary action, and the provision of lugs 34 serves to assist loosening of pliant hood closures.

I claim:

1. A glass milk bottle having a neck, means for controlling drip thereof comprising a continuous shelf formed integral with the neck and having a thickness not exceeding .12" as measured .02" inwardly from the outer periphery of the shelf, said shelf having an upper surface joining an upstanding neck portion subjacent the mouth rim of the neck and a lower surface extending inwardly to the bottle neck and including a portion with a downwardly inwardly slope not exceeding 22 degrees with the horizontal, said portion forming with the lower corner of the shelf edge a line of pouring departure, said lower corner of the shelf edge being substantially horizontal, and a bumper roll integral with said bottle neck and spaced below and from the shelf sufficiently to clear a poured liquid and disposed for protecting the bottle rim and shelf.

2. A glass milk bottle having a neck, means for controlling drip thereof comprising a continuous shelf formed integral with the neck and having a thickness not exceeding .12" as measured .02" inwardly from the outer periphery of the shelf, said shelf having an upper surface joining an upstanding neck portion subjacent the mouth rim of the neck and a lower surface extending inwardly to the bottle neck and including a portion with a downwardly inwardly slope not exceeding 22 degrees with the horizontal, said portion forming a sharply curved lower corner shelf edge, the lower corner of the shelf edge being substantially horizontal, and a bumper roll integral with said bottle neck and spaced below and from the shelf sufficiently to clear a poured liquid and disposed for protecting the bottle rim and shelf.

3. A glass milk bottle having a neck, means for controlling drip thereof comprising a shelf formed integral with the neck and having a thickness not exceeding .12" as measured .02" inwardly from the outer periphery of the shelf, said shelf having an upper surface joining an upstanding neck portion subjacent the mouth rim of the neck and a lower surface extending inwardly to the bottle neck and including a portion with a downwardly inwardly slope not exceeding 22 degrees with the horizontal, said portion forming with the lower corner of the shelf edge a line of pouring departure, said lower corner of the shelf edge being horizontal, and a bumper roll integral with said bottle neck and spaced below and from the shelf sufficiently to clear a poured liquid and disposed for protecting the bottle rim and shelf.

4. A glass milk bottle having a neck, means for controlling drip thereof comprising a continuous shelf formed integral with the neck and having a thickness not exceeding .12" as measured .02" inwardly from the outer periphery of the shelf, said shelf having an upper surface joining an upstanding bottle neck portion at a distance not greater than .25" below the mouth rim of the neck and a lower surface extending inwardly to the bottle neck and including a portion with a downwardly inwardly slope not exceeding 22 degrees with the horizontal, said portion forming with the lower corner of the shelf edge a line of pouring departure, said lower corner of the shelf edge being substantially horizontal, and a bumper roll integral with said bottle neck and spaced below and from the shelf sufficiently to clear a poured liquid and disposed for protecting the bottle rim and shelf.

5. A glass milk bottle having a neck, means for controlling drip thereof comprising a shelf formed integral with the neck and having a thickness not exceeding .12" as measured .02" inwardly from the outer periphery of the shelf, said shelf having an upper surface joining an upstanding neck portion subjacent the mouth rim of the neck and a lower surface extending inwardly to the bottle neck and including a portion with a downwardly inwardly slope not exceeding 22 degrees with the horizontal, said portion forming a sharply curved lower corner shelf edge, the lower corner of the shelf edge being horizontal, and a bumper roll integral with said bottle neck and spaced below and from the shelf sufficiently to clear a poured liquid and disposed for protecting the bottle rim and shelf.

6. A glass milk bottle having a neck, means for controlling drip thereof comprising a continuous shelf formed integral with the neck and having a thickness not exceeding .12" as measured .02" inwardly from the outer periphery of the shelf, said shelf having an upper surface joining an upstanding neck portion at a distance not greater than .25" below the mouth rim of the neck and a lower surface extending inwardly to the bottle neck and including a portion with a downwardly inwardly slope not exceeding 22 degrees with the horizontal, said portion forming a sharply curved lower corner shelf edge, the lower corner of the shelf edge being substantially horizontal, and a bumper roll integral with said bottle neck and spaced below and from the shelf sufficiently to clear a poured liquid and disposed for protecting the bottle rim and shelf.

BRUCE A. JACKSON.